Sept. 18, 1945.     H. P. VASSAR     2,385,044
THERMORESPONSIVE MEASURING INSTRUMENT
Filed Aug. 6, 1942
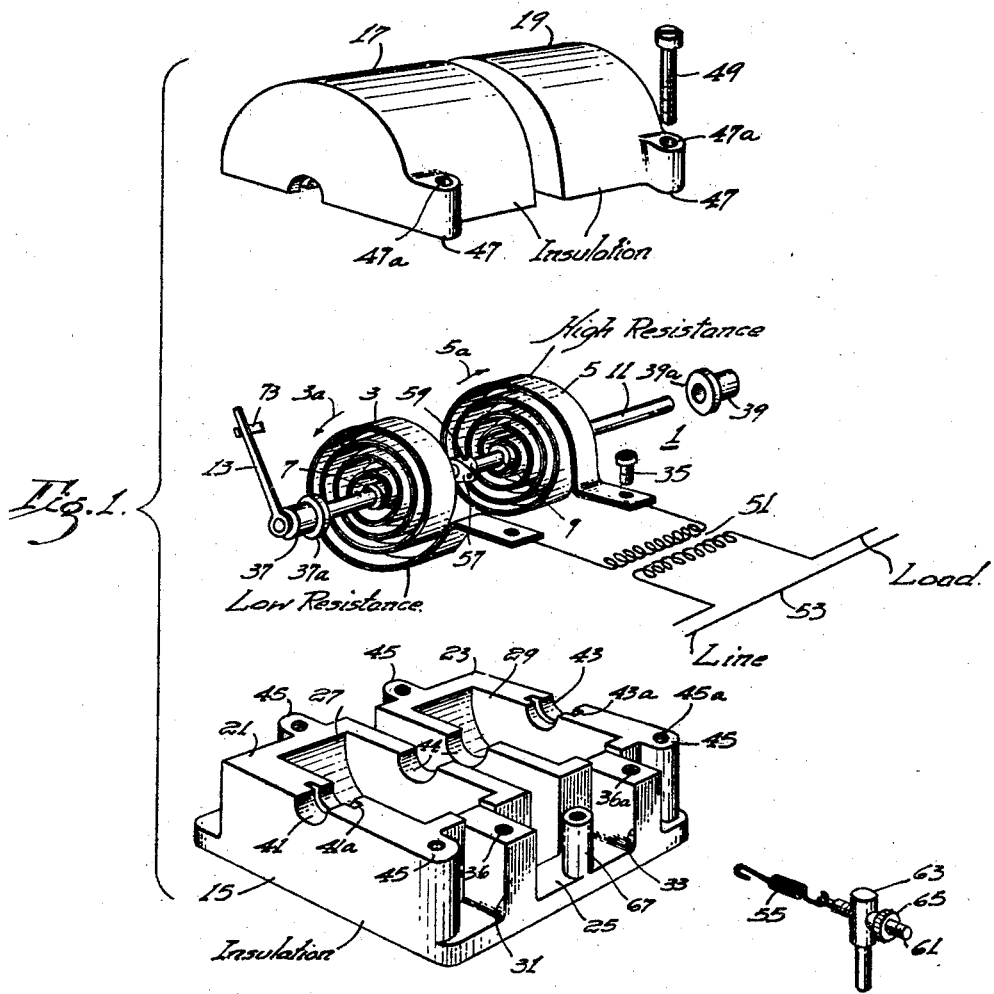
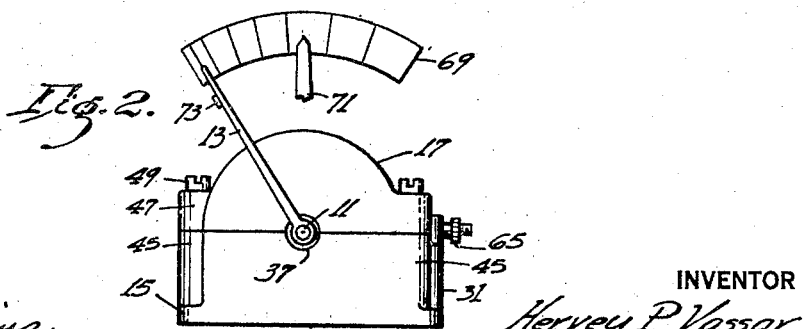
WITNESSES:
INVENTOR
Hervey P. Vassar.
BY
ATTORNEY Patented Sept. 18, 1945

2,385,044

UNITED STATES PATENT OFFICE 2,385,044

THERMORESPONSIVE MEASURING INSTRUMENT

Hervey P. Vassar, Bloomfield, N. J., assignor to Westinghouse Electric Corporation, East Pittsburgh, Pa., a corporation of Pennsylvania Application August 6, 1942, Serial No. 453,782

7 Claims. (Cl. 171—95)

This invention relates to thermoresponsive devices, and it has particular relation to a thermoresponsive device for measuring currents flowing in electrical circuits.

Because of their sturdy construction, high torque, and low maintenance, thermoresponsive devices, such as demand wattmeters, have been favorably received for measuring variable quantities. A device for this purpose generally comprises a pair of thermoresponsive elements, such as flexible fluid containing elements or multimetallic elements, differentially associated with an indicating member. Devices of this type are illustrated in United States Patents 1,156,412, 1,417,-695 and 2,130,829. The expression "multimetallic" defines a laminated metallic structure wherein at least one lamination has a temperature coefficient of expansion which differs from that of another one of the laminations.

For measuring electrical currents, a thermal device may have a pair of thermoresponsive elements acting differentially on a shaft. Because of the differential reationship of the thermoresponsive elements, ambient temperature variations do not affect the accuracy of the measuring device. When the temperatures of the thermoresponsive elements differ, a differential torque is applied to the shaft which corresponds to the difference in temperatures of the elements. Such a difference in temperatures may be provided by placing an electrical resistance heater adjacent one of the thermoresponsive elements and energizing the heater in accordance with a variable electrical current to be measured. A device of this character is illustrated in United States Patent No. 2,212,730.

The provision of a separate heater is undesirable for the reasons that additional parts are required, and indirect heating is somewhat less efficient than direct heating. At the same time, connections to the thermoresponsive elements which would increase the load on the shaft associated therewith should be avoided.

In accordance with the invention, a pair of thermoresponsive elements including an actuating element and a compensating element are both energized in accordance with a variable quantity to be measured. In a specific embodiment of the invention, a pair of multimetallic elements are differentially associated with a shaft. One end of each of the multimetallic elements is electrically and mechanically connected to an end of the other multimetallic element. An electrical circuit then is connected to the free ends of the multimetallic elements for passing a current proportional to the variable quantity to be measured through both of the multimetallic elements in series.

Since the multimetallic elements are differentially associated with a shaft, if the multimetallic elements were similar, the passage of current through both elements in series would have substantially no effect on the position of the shaft. To provide movement of the shaft which is dependent on the variable quantity to be measured, the multimetallic elements are designed to respond differently to current passing therethrough. To this end, the multimetallic elements may have substantially different electrical resistances. Since heat generated by current passing through an electrical resistance varies in accordance with the resistance, it follows that the heat to which each multimetallic element is subjected is dependent on the resistance thereof. For this reason, the same current passing through both of the multimetallic elements in series produces a resultant differential torque acting on the shaft which is dependent on the variable quantity to be measured.

Preferably the multimetallic elements are designed with the same deflection and torque constants relative to temperature variations. With such a construction, the shaft is substantially unaffected by ambient temperature variations.

It is, therefore, an object of the invention to provide an improved thermoresponsive device.

It is a further object of the invention to provide a thermoresponsive device having thermoresponsive elements differentially connected to a shaft with means for passing electrical current directly through both of the thermoresponsive elements in series.

It is another object of the invention to provide a thermoresponsive device having opposed multimetallic elements differing in electrical resistance.

It is still another object of the invention to provide a thermal measuring instrument having opposed multimetallic elements having different electrical resistances connected in a series circuit, the multimetallic elements being designed to have the same deflection and torque constants with respect to temperature.

Other objects of the invention will be apparent from the following description taken in conjunction with the accompanying drawing, in which:

Figure 1 is an exploded view in perspective with parts shown schematically of a thermoresponsive device embodying the invention; and Fig. 2 is a view in front elevation of the thermoresponsive device illustrated in Fig. 1 with parts added.

Referring to the drawing, Fig. 1 shows a thermo-responsive device having an actuating assembly 1 which includes two thermoresponsive elements 3 and 5. In the specific embodiment illustrated in Fig. 1, the thermoresponsive elements take the form of spiral multimetallic springs having their inner ends attached, respectively, to collars 7 and 9 which are secured to a shaft 11. At one end the shaft 11 is provided with a pointer 13 or other suitable device for actuation in accordance with the rotation of the shaft.

For supporting the actuating assembly 1, a housing is provided which includes a base member 15 and cover members 17 and 19. This housing may be formed of material having suitable heat and electrical insulating properties, such as phenolic resin.

In order to minimize the transmission of heat between the multimetallic elements 3 and 5, the base member 15 may be divided into two portions 21 and 23 which are separated by an air space and which are connected by webs 25 having small cross sections and positioned below a major portion of the space occupied by the multimetallic elements 3 and 5.

The portions 21 and 23 of the base member are provided, respectively, with chambers 27 and 29 for receiving the elements 3 and 5. In addition, the base member 15 carries abutments 31 and 33 having threaded openings 36 and 36a therein. When the elements 3 and 5 are in mounted position in their chambers 27 and 29, their outer ends may be attached to the abutments 31 and 33 in any suitable manner, as by machine screws 35 which pass through openings in the ends of the multimetallic elements for threaded reception in the threaded openings 36 and 36a.

To permit rotation of the shaft 11 relative to the housing, the shaft is provided with a pair of bearings 37 and 39 having flanges 37a and 39a. For the reception of these bearings, the base member 15 is provided with recesses having semi-cylindrical surfaces 41 and 43. Each of these surfaces has associated therewith a concentric groove 41a or 43a for receiving, respectively, the flanges 37a and 39a of the bearings. Additional passageways 44 for the shaft 11 may be provided as required.

In order to complete the enclosure of the actuating assembly, each of the cover members is provided with chambers, semi-cylindrical surfaces, and grooves which correspond to the chambers 27 and 29, the surfaces 41 and 43, and the grooves 41a and 43a of the base member 15. The cover members may be secured to the base member in any suitable manner. As illustrated, the base member is provided with four abutments 45 each having a threaded opening 45a. Each of the cover members is provided with a pair of projections 47 having openings 47a which are aligned with a pair of the threaded openings 45a when the cover members are in mounted position on the base member. Suitable machine screws 49 then may be passed through the openings 47a into the threaded openings 45a for securing the cover members to the base member.

The multimetallic elements 3 and 5 are designed to act differentially on the shaft 11. Such action may be obtained by mounting the elements with their convolutions wound in opposite directions, as clearly illustrated in Fig. 1.

For the purpose of discussion, it will be assumed that when the temperature to which the elements are subjected is raised, the element 3 urges the shaft 11 in the direction of the arrow 3a, whereas the element 5 urges the shaft 11 in the direction of the arrow 5a.

In order to energize the elements 3 and 5, the inner ends of the elements are connected not only mechanically but electrically. This connection may be effected by forming the shaft 11 of an electroconductive material, such as brass or steel. An electrical current dependent on the variable quantity to be measured then is passed through the elements 3 and 5 in series. This current may be either a direct current or an alternating current. For the purpose of discussion, it is assumed that the current is an alternating current which alternates at a conventional frequency of 60 cycles per second. The elements may be energized from a single phase, two or three-wire system, or a polyphase system in accordance with current flowing therein. In the specific embodiment of Fig. 1, the secondary winding of a current transformer 51 is connected in any suitable manner to the outer ends of the elements 3 and 5. The primary winding of the current transformer 51 is included in one conductor of a circuit 53 which supplies current from an incoming line to a load. Consequently, the elements 3 and 5 are energized in accordance with load current flowing in the circuit 53.

If the elements 3 and 5 were exactly similar, current flowing therethrough would produce no displacement of the shaft 11. This is true despite the fact that current flowing through the resistance of the elements would produce heat and would raise the temperatures thereof. The increase in torque applied to the shaft by one element would be compensated by that of the other element.

In order to produce a rotation of the shaft which is dependent on the magnitude of the current flowing through the multimetallic elements, the elements are designed to respond differently to the current flowing therethrough. Conveniently this may be effected by constructing the elements 3 and 5 with different electrical resistances. For the purpose of discussion, it will be assumed that the element 5 has a substantially higher resistance than the resistance of the element 3.

Because of the difference in resistances of the elements, the same current flowing therethrough produces more heat in the element 5 than in the element 3. For this reason, the temperature of the element 5 is raised to a higher value than that of the element 3. Since the deflection and torque developed by a multimetallic element is dependent upon the temperature to which it is raised, it follows that the elements 3 and 5 may be designed to deflect the shaft 11 in accordance with the electrical current flowing therethrough.

As previously pointed out, it is desirable that both of the elements 3 and 5 have similar torque and deflection constants with respect to temperature. With such a construction, an equal variation in temperature of both of the elements has no effect on the position of the shaft 11. Consequently variations in ambient temperature would not affect the position of the pointer 13.

As examples of suitable materials for the multimetallic elements, the high resistance bimetallic element 5 may be formed from a layer of material having a low temperature coefficient of expansion, such as a 36% nickel-iron alloy, and a layer of material having a high temperature coefficient of expansion, such as an iron alloy containing approximately 15% nickel, 10% manganese, and 5% aluminum.

The low resistance element 3 may be formed from a layer of material having a low temperature coefficient of expansion, such as a 36% nickel-iron alloy, an intermediate layer of high conductivity copper-cadmium alloy, and a layer of material having a high temperature coefficient of expansion, such as an austenitic nickel-chromium steel.

Multimetallic materials of the foregoing types are marketed by the H. A. Wilson Company of Newark, New Jersey, under the trade designations R-440 and R-39. The high resistance material has a resistivity slightly greater than eleven times the resistivity of the low resistance material. Despite this substantial difference in resistivities, the two multimetallic materials have substantially the same torque and deflection constants with respect to temperature. When these materials are employed, the elements 3 and 5 may be formed with equal dimensions.

To permit adjustment of the thermoresponsive device, a spring 55 has one end connected to an arm 57 which is attached to a collar rotatably mounted on the shaft 11. This collar is secured in any desired position by means of a setscrew 59. The remaining end of the spring 55 is connected to a screw 61 which passes through an opening in a post 63 and has an adjusting nut 65 on its outer end. The post 63 is designed for insertion in a pillar 67 formed on the base member 15.

To adjust the thermal device, the setscrew 59 is loosened and the pointer 13 is turned to its zero position. With the pointer in this position, the setscrew is tightened. This adjustment renders the zero position of the pointer 13 independent of the tension of the spring 55. The thermoresponsive device then is energized by a predetermined current for a time sufficient to carry the pointer 13 to predetermined position on a scale 69 associated with the pointer 13. If the pointer 13 fails to move to the required position, the nut 65 is operated to vary the tension of the spring 55 sufficiently to bring the pointer 13 to the required position. This adjustment is disclosed in greater detail in the aforesaid Patent 1,417,695 and in my copending application, Serial No. 394,260, filed May 20, 1941, which has issued as Patent 2,323,738.

Although the information conveyed by the pointer 13 alone may suffice, it sometimes is desirable to provide a frictionally held pointer 71 for indicating the maximum advance of the pointer 13 over a predetermined period. For this purpose, the pointer 13 may be provided with a lug 73 which engages the pointer 71 and advances the pointer 71 when the pointer 13 is actuated beyond the position initially occupied by the pointer 71. The frictionally held pointer 71 maintains a maximum position to which it is advanced. Such pointers are well known in the art, and are illustrated in the aforesaid Patent 1,417,695, and in my aforesaid copending application.

It is believed that the operation of the thermoresponsive device thus far described is apparent from the foregoing description. If it is desired to measure current flowing in the circuit 53, the fixed ends of the elements 3 and 5 are connected for energization in accordance with the current to be measured. In Fig. 1, such energization is effected through the current transformer 51. This connection results in the flow of current through the elements 3 and 5 in series. Since the element 5 has a resistance substantially higher than that of the element 3, the heat to which it is subjected and the temperature to which it is raised are substantially higher than the corresponding heat and temperature of the element 3. Since the elements 3 and 5 have similar deflection and torque constants, the higher torque developed by the element 5 operates to rotate the shaft 11 until the actuating torque of the element 5 and the compensating torque of the element 3 are again substantially equal.

The time required for the pointer 13 to reach a new position following a change in the current flowing through the bimetallic elements 3 and 5 depends upon the thermal lagging of the complete thermoresponsive device. In certain cases, a lagging is desired which will bring the pointer 13 to 90% of the total movement required by the change in energization in a period of 15 minutes. Such lagging is well understood in the art.

Should the ambient temperature to which the thermoresponsive device is subjected change, the temperatures of the elements 3 or 5 increase or decrease by the same amount. Since the elements 3 and 5 are differentially related with respect to the shaft 11, and since they have substantially equal deflection and torque constants with respect to temperature, such variations in ambient temperature have substantially no effect on the position of the shaft 11 and the pointer 13.

It should be observed that a thermoresponsive device designed in accordance with the invention requires no separate heating elements. The actuating element 5 and the compensating element 3 serve as heaters. This arrangement provides optimum thermal efficiency.

Despite the supply of current directly to the multimetallic elements no auxiliary flexible connections thereto are required. Consequently the friction loads introduced by flexible connections are avoided.

Although the invention has been described with reference to certain specific embodiments thereof, numerous modifications are possible. Therefore, the invention is to be restricted only by the appended claims as interpreted in view of the prior art.

I claim as my invention:

1. In a measuring device for measuring a function of an electrical current over a substantial range of variation thereof, first thermoresponsive means having a first response to a variable quantity, second thermoresponsive means having a response to said variable quantity which differs from said first response, each of said thermoresponsive means comprising a pair of metallic elements having different temperature coefficients of expansion, means for energizing said first and second thermoresponsive means in accordance with said variable quantity, and means differentially controlled by the responses of said first thermoresponsive means and said second thermoresponsive means, said first thermoresponsive means and said second thermoresponsive means having similar responses to ambient temperature variations, whereby said differentially controlled means is substantially independent of ambient temperature variations.

2. In a thermal device for measuring a function of an electrical current over a substantial range of variation thereof, a first thermoresponsive element having a deflection characteristic which varies in accordance with a first function of a variable electrical current flowing therethrough, a second thermoresponsive element having a deflection characteristic which varies in accordance with a function of a variable electrical current flowing therethrough which differs from said first function, each of said thermoresponsive elements comprising a pair of portions having different temperature coefficients of expansion, means for passing a variable electrical current in series through said thermoresponsive elements, and means differentially responsive to said thermoresponsive elements, said first thermoresponsive element and said second thermoresponsive element having similar responses to ambient temperature variations thereof, whereby said differentially responsive means is substantially independent of ambient temperature variations.

3. In a thermal device, a pair of spiral thermoresponsive springs having different electrical resistances, each of said springs comprising a pair of metallic elements having different temperature coefficients of expansion, means comprising a shaft mechanically and electrically connecting the inner ends of said spiral springs, and supporting means mounting said shaft for rotation relative to the outer ends of said springs, said springs being disposed to apply torques differentially to said shaft when electrical current is passed through said springs.

4. In a thermal device, a pair of spiral thermoresponsive springs having different electrical resistances, each of said springs comprising a pair of metallic elements having different temperature coefficients of expansion, means comprising a shaft mechanically and electrically connecting the inner ends of said spiral springs, supporting means mounting said shaft for rotation, said supporting means including means retaining the outer ends of said springs in substantially fixed relationship relative to said supporting means, and an electrical circuit connected to said outer ends of said spiral springs for passing electrical current in series through said springs, said springs being designed to actuate differentially said shaft.

5. In a thermal measuring device, a pair of spiral thermoresponsive springs having different electrical resistances, each of said springs comprising a pair of metallic elements having different temperature coefficients of expansion, means comprising a shaft mechanically and electrically connecting the inner ends of said spiral springs, and supporting means mounting said shaft for rotation relative to the outer ends of said springs, said springs having responses which are similar with respect to temperature variations of said springs, said springs being designed to actuate differentially said shaft.

6. In a measuring device, a pair of electroconductive thermoresponsive elements, each of said elements when heated having a first portion which moves relative to a second portion thereof, a supporting structure, means securing said first portions to said supporting structure, said first portions being electrically insulated from each other, and electroconductive means connecting said second portions for movement as a unit relative to said supporting structure, said elements in response to equal heating thereof being designed to develop equal deflection forces operating differentially on said electroconductive means, said elements having different electrical resistances, whereby when electrical current is directed in series through said elements the electroconductive means moves relative to said supporting structure in accordance with a function of said current.

7. In a measuring device, a pair of spiral electroconductive thermoresponsive elements, each of said elements comprising a plurality of laminations having different thermal coefficients of expansion, whereby when said elements are heated the inner ends thereof move relative to the outer ends of the elements, a supporting structure, means securing the outer ends of the elements to the supporting structure, the outer ends being electrically insulated from each other, and electroconductive means connecting the inner ends of the elements for rotation as a unit relative to the supporting structure, said elements in response to equal heating thereof being designed to develop equal forces operating differentially on said electroconductive means, said elements having different electrical resistances, whereby when electrical current is directed in series through the elements, the electroconductive means rotates relative to said supporting structure in accordance with a function of the magnitude of the electrical current.

HERVEY P. VASSAR.